No. 854,592. PATENTED MAY 21, 1907.
L. NELSON.
BAKING UTENSIL FOR CAKES AND PIES.
APPLICATION FILED FEB. 5, 1906.

WITNESSES:
Effie M. Lohrman
W. T. Harlan

INVENTOR:
Louise Nelson

UNITED STATES PATENT OFFICE.

LOUISE NELSON, OF OAKLAND, CALIFORNIA.

BAKING UTENSIL FOR CAKES AND PIES.

No. 854,592.           Specification of Letters Patent.           Patented May 21, 1907.

Application filed February 5, 1906. Serial No. 299,643.

*To all whom it may concern:*

Be it known that I, LOUISE NELSON, a citizen of the United States, residing at Oakland, in the county of Alameda and State of California, have invented a new and useful Improvement in Baking Utensils for Cakes and Pies, of which the following is a specification.

My invention relates to a baking utensil for cakes and pies.

The object of the improvement is to enable one to more conveniently remove the cake or pie from the utensil while hot without falling or being crushed.

I attain this object by the mechanism illustrated in the accompanying drawing, in which—

Figure 1:
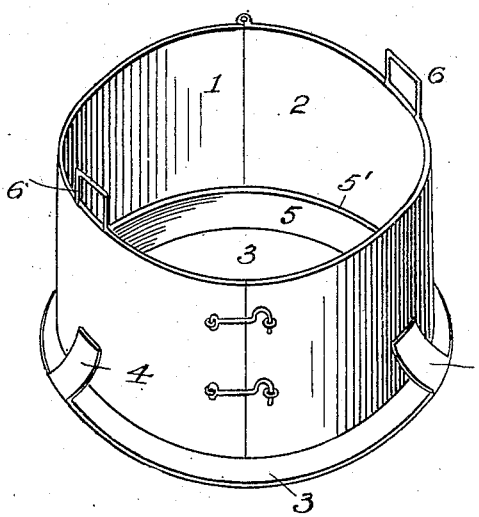
Figure 2:
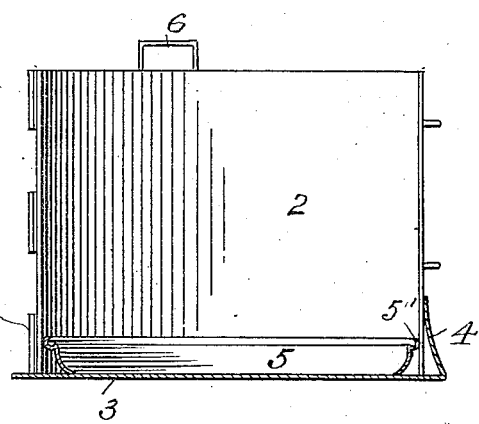
Figure 3:
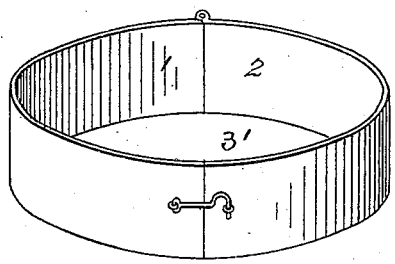
Figure 4:
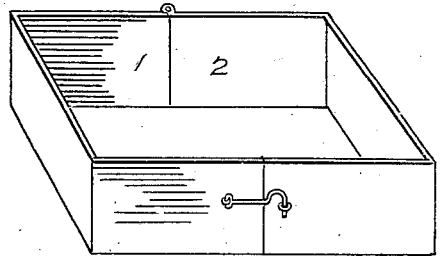
Figure 5:
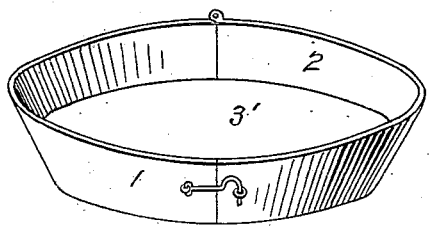

Figure 1 is the cake dish ready for use; Fig. 2 is a sectional view; Fig. 3 is a tin for layer cakes; Fig. 4 is a square dish; Fig. 5 is a pie tin.

Referring to drawing, Fig. 1 shows the cake dish in three parts 1, 2 and 3 set up ready to put the cake in; the bottom of which is perfectly flat and extends one-half inch beyond the cylindrical or square wall, thus enabling a knife to be run under the cake loosening it from the bottom and by pressing upward gently the wall may be separated from the bottom, it being held in place by a number of small ears 4 which spring gently apart.

On the bottom of the interior of the cylindrical wall, there is a separate loose small rim 5 that is of concaved form and has its upper edge 5' fitting snugly within the parts 1, 2. The purpose of this rim is to prevent the batter from running out. The two little ears 6 at the top of the cylindrical or square wall is to enable the cake or pie to be set bottom side up while still hot in the tin, allowing the steam to escape. The same idea is carried out in all of the tins in any size or shape that is used for baking.

In the case of Figs. 3 and 5, for the layer cake and pie, one-half of the bottom 3' will be solid with the rim and one-half will be separate and the tin or cylindrical wall will unhook and swing out allowing the pie or cake to slip out on the open half.

I am aware that previous to my invention there was a tin patented with a separate bottom, but it has a bottom that slips inside, making it impossible to take out the cake without turning it bottom side up and taking out the whole bottom; while the rim of my tin sets on a flat piece of tin which forms the bottom, and which extends all around the rim about one-half inch. The small ring on the inside of the rim, which prevents the batter from running out, and enables a knife to be run under the bottom of the cake is a distinct advantage as the cake can be lifted off the bottom of the tin without taking it out of the rim or disturbing the cake at all. This is an especial advantage in the case of delicate pies and cakes, as allowing them to cool in the utensil causes them to taste of the tin.

Having thus described my invention what I claim as new and desire to secure by Letters Patent is,—

A bake pan having separable sides and bottom, means between said sides and bottom for retaining them in position, and a concaved rim within said sides and having its upper edge snugly fitting the latter, said rim resting upon said bottom.

LOUISE NELSON.

Witnesses:
  F. B. HOUGH,
  EFFIE M. LOHRMAN.